(12) United States Patent
Hayakawa et al.

(10) Patent No.: US 11,459,180 B2
(45) Date of Patent: Oct. 4, 2022

(54) METHOD OF PRODUCING HONEYCOMB GREEN BODY OR FIRED ARTICLE, BEARER AND METHOD OF PRODUCING THE SAME

(71) Applicant: NGK INSULATORS, LTD., Nagoya (JP)

(72) Inventors: Yusuke Hayakawa, Nagoya (JP); Yasunori Yamazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 742 days.

(21) Appl. No.: 16/256,102

(22) Filed: Jan. 24, 2019

(65) Prior Publication Data

US 2019/0248593 A1   Aug. 15, 2019

(30) Foreign Application Priority Data

Feb. 9, 2018 (JP) .............................. JP2018-022244

(51) Int. Cl.

| B28B 13/04 | (2006.01) |
| B28B 3/26 | (2006.01) |
| B28B 11/16 | (2006.01) |
| C04B 38/00 | (2006.01) |
| B65G 29/00 | (2006.01) |
| B65G 33/00 | (2006.01) |
| B65G 31/00 | (2006.01) |

(52) U.S. Cl.
CPC .............. *B65G 29/00* (2013.01); *B28B 3/269* (2013.01); *B28B 11/16* (2013.01); *B28B 13/04* (2013.01); *C04B 38/0009* (2013.01); *B65G 31/00* (2013.01); *B65G 33/00* (2013.01)

(58) Field of Classification Search
None
See application file for complete search history.

(56) References Cited

U.S. PATENT DOCUMENTS

| 4,674,376 | A | * | 6/1987 | Hattori .................. B28B 11/163 |
| | | | | 425/142 |
| 4,810,458 | A | * | 3/1989 | Oshima .................... B28B 3/20 |
| | | | | 264/177.11 |
| 5,429,226 | A | * | 7/1995 | Ensch ..................... B65G 17/44 |
| | | | | 198/803.14 |
| 2002/0046925 | A1 | | 4/2002 | Miyakawa et al. |
| 2003/0090038 | A1 | * | 5/2003 | Ishikawa ................ B28B 11/248 |
| | | | | 264/432 |
| 2004/0076705 | A1 | * | 4/2004 | Ishikawa ................. B65G 35/06 |
| | | | | 425/315 |
| 2010/0237123 | A1 | * | 9/2010 | Fujioka ..................... B29C 48/11 |
| | | | | 226/7 |
| 2011/0083942 | A1 | | 4/2011 | Tajima et al. |

(Continued)

FOREIGN PATENT DOCUMENTS

| JP | 4017324 B2 | 12/2007 |
| JP | 2011-079254 A1 | 4/2011 |
| JP | 5964205 B2 | 8/2016 |

*Primary Examiner* — Erin Snelting
(74) *Attorney, Agent, or Firm* — Burr & Brown, PLLC

(57) ABSTRACT

A bearer for bearing a honeycomb green body includes a solid main body provided with a groove in which a concave arc surface extends along one direction; and a single-layer or multi-layer sponge layer attached to the arc surface of the groove. The sponge layer is curved along the arc surface of the groove and has a bearing surface curved along the arc surface.

14 Claims, 6 Drawing Sheets

(56) References Cited

U.S. PATENT DOCUMENTS

| | | | |
|---|---|---|---|
| 2011/0210473 A1* | 9/2011 | Duroe | B28B 17/0072 264/211.12 |
| 2014/0138871 A1* | 5/2014 | Kato | B28B 11/243 264/232 |
| 2015/0210024 A1 | 7/2015 | Koide et al. | |
| 2015/0258725 A1* | 9/2015 | Fukui | B29C 48/0022 198/803.14 |
| 2018/0334328 A1* | 11/2018 | Duroe | B28B 3/20 |

* cited by examiner

METHOD OF PRODUCING HONEYCOMB GREEN BODY OR FIRED ARTICLE, BEARER AND METHOD OF PRODUCING THE SAME

This application claims the benefit under 35 USC § 119(a)-(d) of Japanese Application No. 2018-022244 filed Feb. 9, 2018, the entirety of which is incorporated herein by reference.

FIELD OF THE INVENTION

The present disclosure is related to a method of producing a honeycomb green body or fired article, a bearer and a method of producing the same.

BACKGROUND OF THE INVENTION

Japanese Patent Application Laid-open No. 2011-79254 discloses a bearer having a bearing surface that is made of material of porous hardened resin of polyurethane. Japanese Patent No. 4017324 discloses in its FIG. 7 that a receiving portion of a support made of styrene-foam is covered by a non-woven fabric (See para. 0024 of the same document). Japanese Patent No. 5964205 discloses a bearer provided with a flexible main body.

SUMMARY OF THE INVENTION

Along with a thickness of cell-wall defining cells in a honeycomb green body extruded from an extruder die becomes thinner and a cell size becomes larger, local deformations tend to be formed in an inward region of the honeycomb green body relative to its outer peripheral wall when a bearer bears the honeycomb green body, inducing a technical problem of lowered production yield. An example of this local deformation may be one where cell-walls, which are designed to run in parallel, are coupled together to close a cell, but should not be limited to this. FIG. 8 schematically illustrates that, when a bearer 210 bears a honeycomb green body 90, a shape of cell-walls collapse in the inward region of the honeycomb green body 90 relative to the outer peripheral wall 94.

Japanese Patent Application Laid-open No. 2011-79254 employs a porous polyurethane resin as a material from a viewpoint of securing a machining accuracy for a bearing surface of the bearer. However, as an object to be machined is porous material, there would be a limit in enhancing the machining accuracy, and a negligible burden of machining would be required for approximating a surface shape or curvature of the bearing surface of the bearer to a target surface shape or curvature.

A method of producing a honeycomb green body according to an aspect of the present disclosure may include:

a step in which an extruder extrudes through a die a honeycomb green body so that a lattice of cell-walls is formed in accordance with a structure of the die, the lattice of cell-walls defining a plurality of cells extending in an extrusion direction of the honeycomb green body by the extruder, the number of cells per 1 $cm^2$ in a plane perpendicular to the extrusion direction being 30 to 180, and the thickness of the cell-wall being 0.05 to 0.30 mm; and a step in which a bearer bears at a vertically downward position the honeycomb green body extruded from the extruder, wherein the bearer comprises:

a solid main body provided with a groove in which an arc surface recessed vertically downward extends along the extrusion direction; and a single-layer or multi-layer sponge layer attached to the arc surface of the groove, the sponge layer being curved along the arc surface of the groove and having a bearing surface curved along the arc surface.

In some cases, the sponge layer may include at least urethane or polyethylene.

In some cases, the sponge layer may be an open cell sponge layer.

In some cases, a value of 25% hardness of the bearing surface of the sponge layer based on JIS K 6401 standard may be equal to or less than 130N.

In some cases, a thickness of the sponge layer may be between 10 mm and 20 mm.

In some cases, the solid main body may include at least one material selected from a group consisting of a styrene-foam, porous polyurethane resin, and chemical wood.

In some cases, shore hardness of the arc surface may be 40 to 70 HS.

In some cases, the maximum depth of the groove may be equal to or greater than 35 cm.

In some cases, the sponge layer of a single layer may be provided onto the recessed arc surface of the solid main body.

In some cases, the method of producing a honeycomb green body may further include a step of cutting the honeycomb green body borne by the bearer.

A method of producing a honeycomb fired article according to an aspect of the present disclosure may include a step of firing a honeycomb green body obtained by any one of the above-described method of producing a honeycomb green body.

A bearer for bearing a honeycomb green body according to an aspect of the present disclosure may include:

a solid main body provided with a groove in which a concave arc surface extends along one direction; and a single-layer or multi-layer sponge layer attached to the arc surface of the groove, wherein the sponge layer is curved along the arc surface of the groove and has a bearing surface curved along the arc surface.

In some cases, the sponge layer may extend up to a top surface of the solid main body where the groove is formed.

A method of producing a bearer for bearing a honeycomb green body according to an aspect of the present disclosure may include:

a step of laminating a sponge layer onto a flexible sheet member;

a step of introducing the sheet member, while being curved, into a groove of a solid main body where a concave arc surface extends in one direction; and a step of attaching to the arc surface of the groove the sponge layer being curved as the curved sheet member.

According to aspects of the present disclosure, a local deformation may be avoided or suppressed to be formed in an inward region of the honeycomb green body relative to its outer peripheral wall and/or a burden may be reduced to approximate a surface shape or curvature of a bearing surface of a bearer to a target surface shape or curvature.

BRIEF DESCRIPTION OF THE DRAWINGS

Hereinafter, non-limiting embodiments of the present disclosure will be described with reference to FIGS. 1 to 8 in which like parts are identified by the same numbers. A skilled person would be able to combine respective embodiments and/or respective features without requiring excess descriptions, and would appreciate synergistic effects of such combinations. Overlapping descriptions among the embodiments would be basically omitted. Referenced drawings are prepared for the purpose of illustration of invention, and may possibly be simplified for the sake of convenience of illustration.

DETAILED DESCRIPTION OF THE INVENTION

In the following descriptions, a plurality of features described for a bearer, a method of producing the same, a method of producing a honeycomb green body would be understood as individual features independent to other features, additionally to as combination with other features. The respective features would be understood as individual features without requiring combination with other features, but could be understood as combination with one or more other features. Describing all combinations of individual features would be redundant for a skilled person, and thus omitted. The individual features would be identified by a language of "In some cases". The individual features would be understood as a universal feature that is effective not only to a bearer, a method of producing the same, a method of producing a honeycomb green body disclosed in the present application, but also effective to other various bearers, methods of producing the same, methods of producing a honeycomb green body not particularly described in the present specification.

Figure 1:
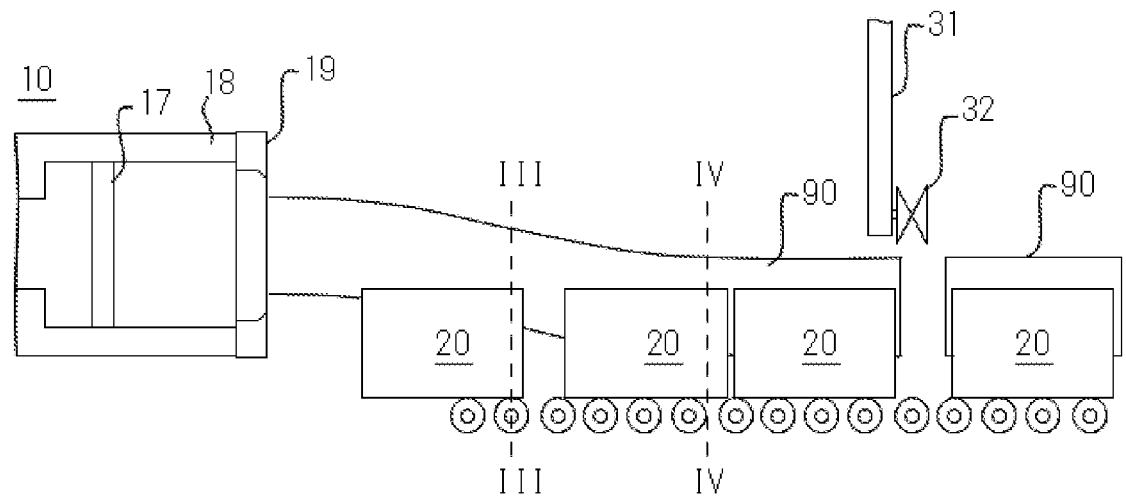
FIG. 1 is a schematic process view showing that a honeycomb green body extruded from an extruder die is borne by a bearer with respect to a method of producing a honeycomb green body according to an aspect of the present disclosure.
Figure 2:
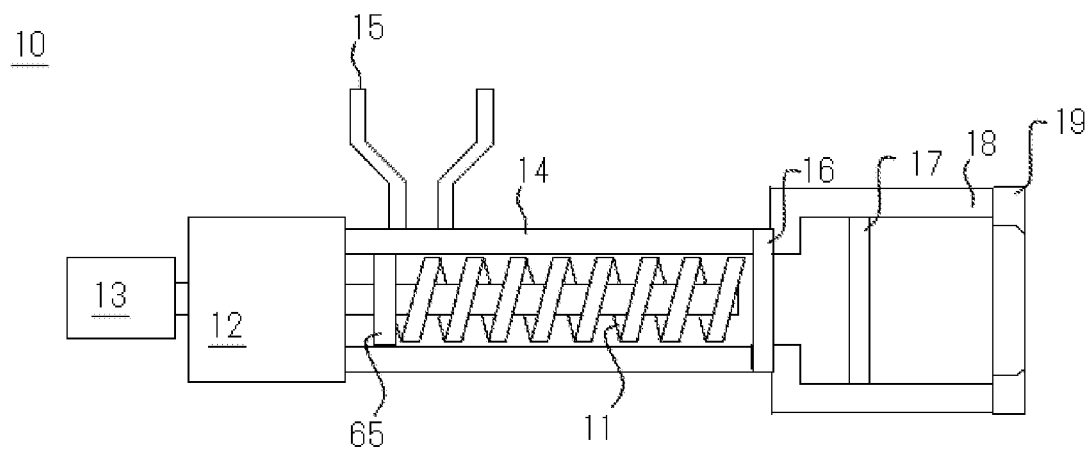
FIG. 2 is a schematic view showing a schematic configuration of an extruder used for producing a honeycomb green body according to an aspect of the present disclosure.
Figure 3:
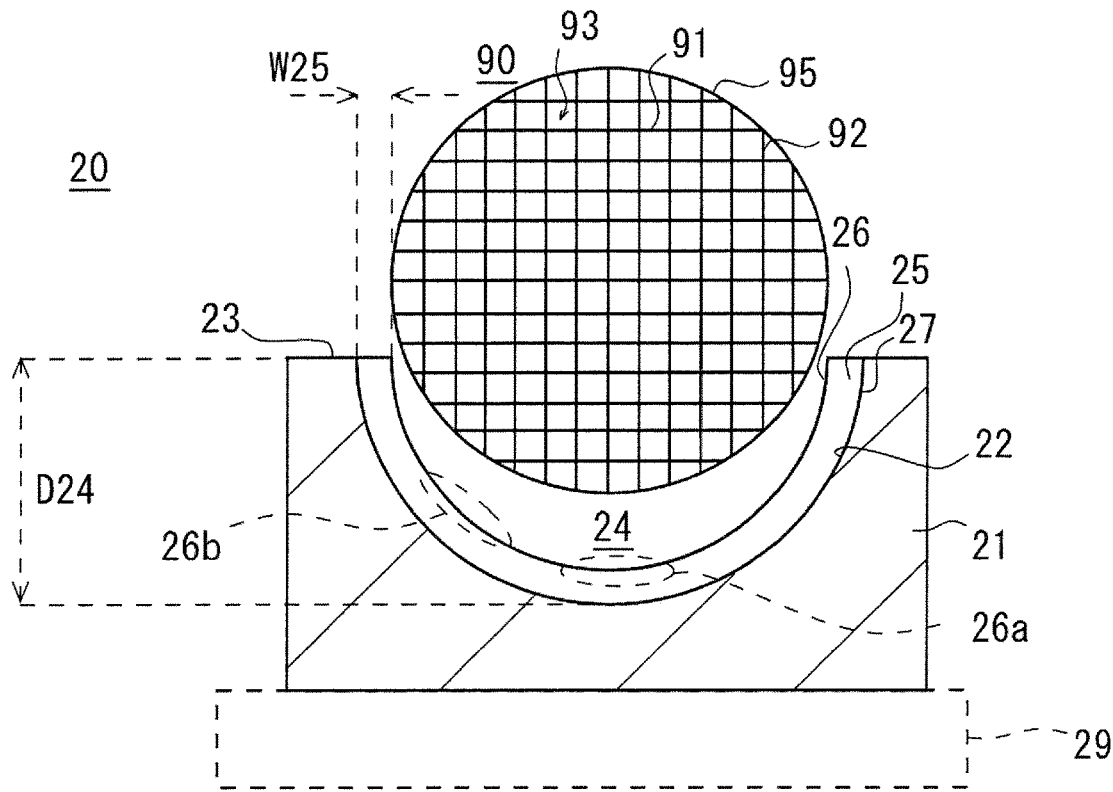
FIG. 3 is a schematic cross-sectional view of a honeycomb green body and a bearer taken along a broken line III-III in FIG. 1.
Figure 4:
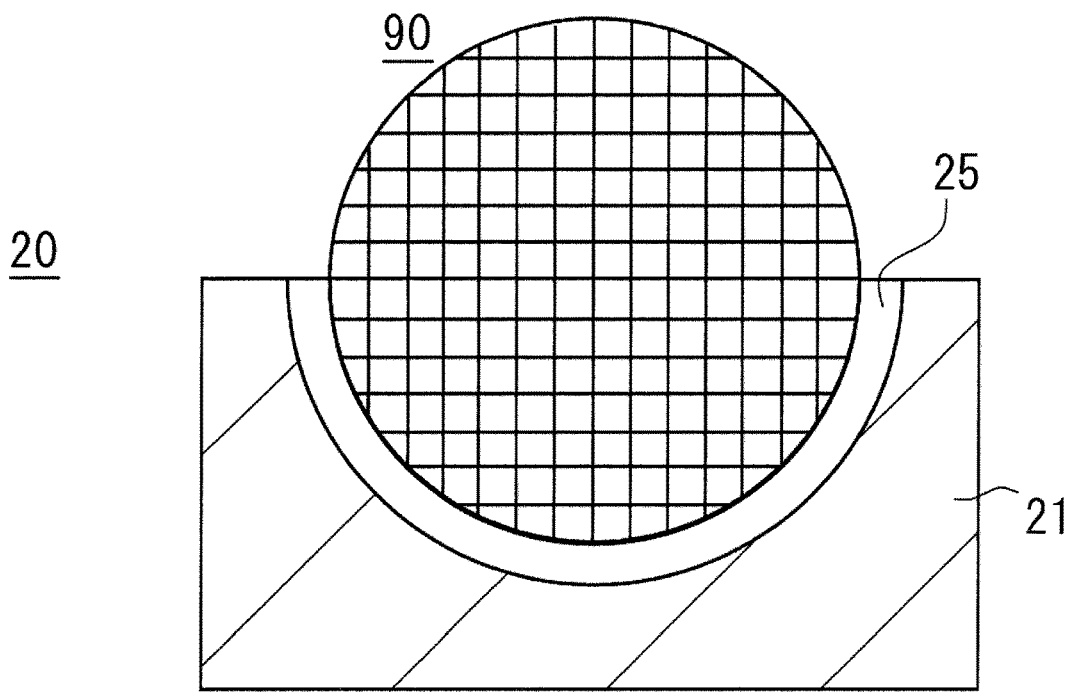
FIG. 4 is a schematic cross-sectional view of a honeycomb green body and a bearer taken along a broken line INT-INT in FIG. 1.
Figure 5:
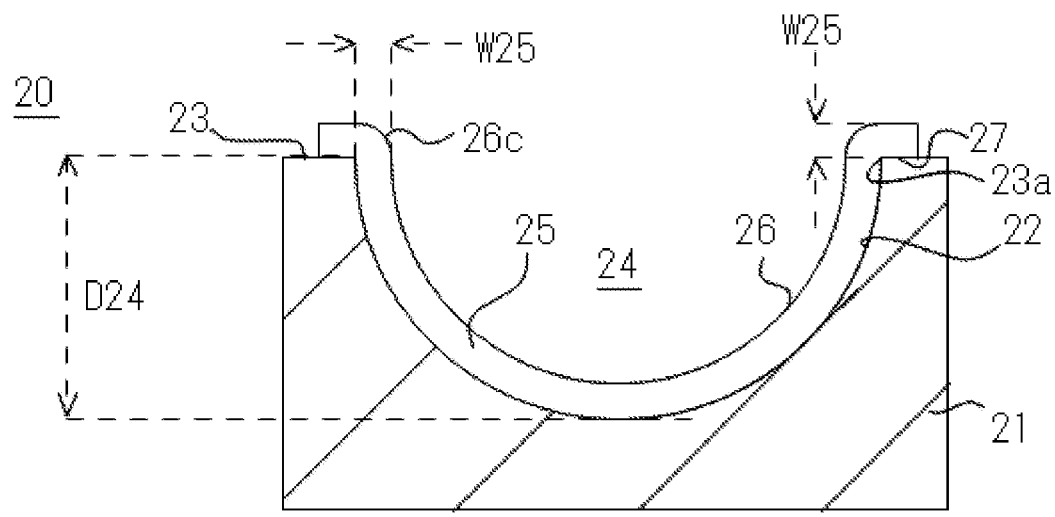
FIG. 5 is a schematic view showing one variation of the bearer.
Figure 7:
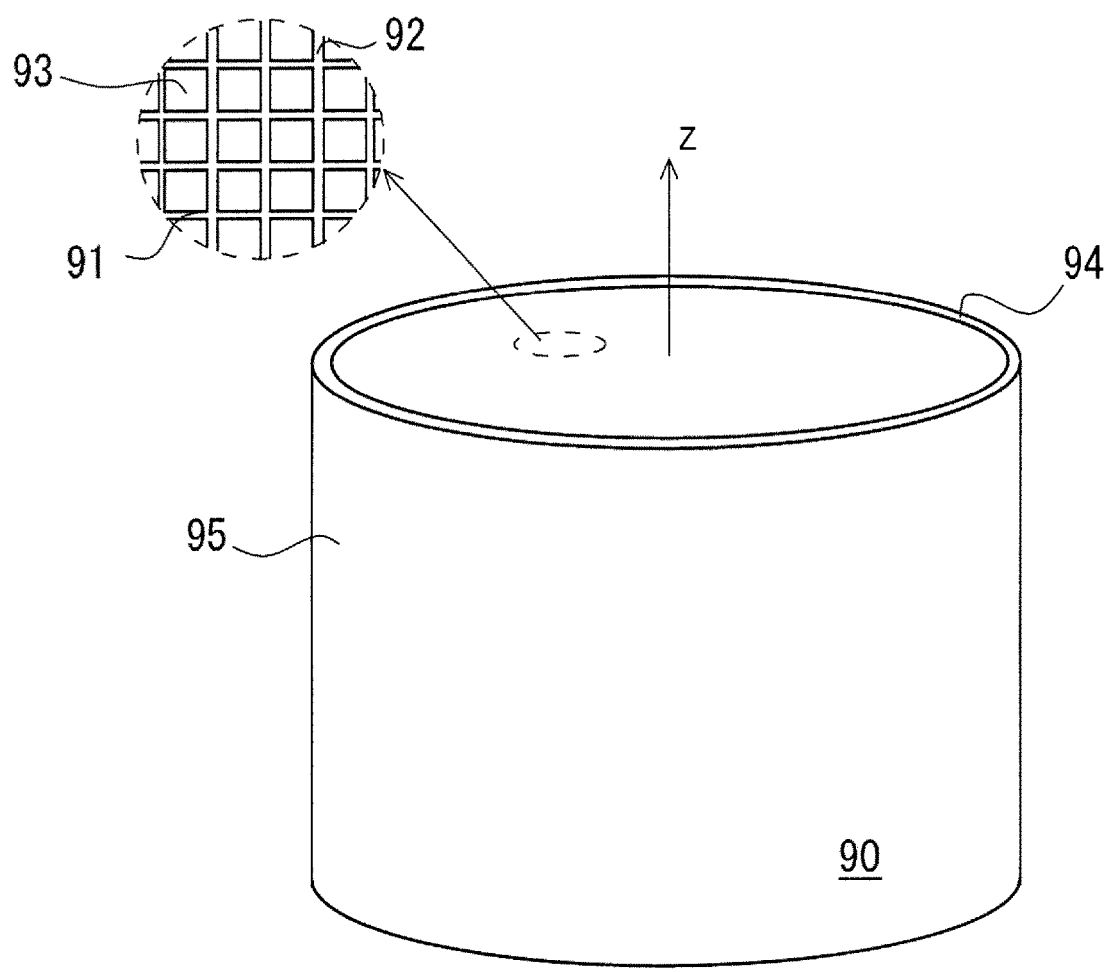
FIG. 7 is a schematic view showing a honeycomb green body and a fired article.
Figure 8:
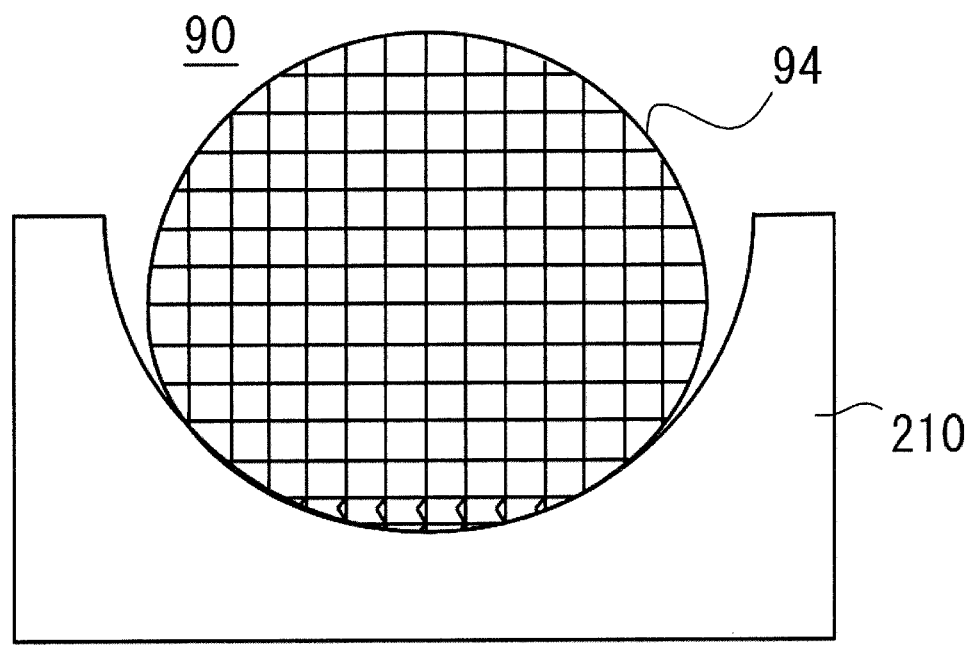
FIG. 8 is a schematic view showing an example where a honeycomb green body is deformed locally.

FIG. 1 is a schematic process view showing that a honeycomb green body 90 extruded from a die 19 of an extruder 10 is borne by a bearer 20 with respect to a method of producing a honeycomb green body 90. FIG. 2 is a schematic view showing a schematic configuration of an extruder 10 used for producing a honeycomb green body 90. FIG. 3 is a schematic cross-sectional view of a honeycomb green body and a bearer taken along a broken line III-III in FIG. 1. FIG. 4 is a schematic cross-sectional view of a honeycomb green body and a bearer taken along a broken line INT-INT in FIG. 1. FIG. 5 is a schematic view showing one variation of the bearer 20. FIGS. 6A-6D are schematic process views showing a method of producing a bearer 20. FIG. 7 is a schematic view showing a honeycomb green body 90 and a fired article. FIG. 8 is a schematic view showing an example where a honeycomb green body 90 is deformed locally.

A method of producing a honeycomb green body 90 according to the present disclosure includes a step in which an extruder 10 extrudes through its die 19 a honeycomb green body 90, and a step in which a bearer 20 bears at a vertically downward position the honeycomb green body 90 extruded from the extruder 10. The produced honeycomb green body 90 extends along a predetermined direction (Z-axis in FIG. 7) that matches the extrusion direction by the extruder 10, and has a lattice of cell-walls 91, 92 that define a plurality of cells 93. A desired cell-wall structure will be formed by appropriately determining a structure of the die 19, and any arbitrary polygonal shape of cell 93 such as triangle to octagon would be defined. The honeycombed structure of the honeycomb green body 90 should not be a lattice structure of beehive, but would include other lattice structures. A shape of the cell 93 in the honeycomb green body 90 would be any polygonal shape as described above, should not be limited to a hexagon and may include a combination of two or more polygons. For example, a combination of two or more polygons may be a combination of rectangle and octagon, but should not be limited to this.

Note that, in FIG. 7, the honeycomb green body 90 has plural first cell-walls 91 extending in a first direction, and plural second cell-walls 92 extending in a second direction crossing the first direction. The first cell-wall 91 and the second cell-wall 92 cross at right angles, defining a rectangular cell 93 by first cell-walls 91 adjacent in the second direction and second cell-walls 92 adjacent in the first direction. In some cases, the honeycomb green body 90 has an outer peripheral wall 94 that is thicker than the cell-wall 91, 92. The outer peripheral wall 94 is also a portion shaped in accordance with the die 19.

Raw material fed into the extruder 10 is a clay and is, in some cases, a clay including a raw material that will be cordierite ($2MgO2Al_2O_3 5SiO_2$) through being fired. The clay may include an organic binder and a dispersion medium such as water which will be removed through a step of degreasing. Therefore, the honeycomb green body 90 extruded from the extruder 10 has a soft clayey. The raw material that will be cordierite ($2MgO2Al_2O_3 5SiO_2$) through being fired may be referred as a cordierite precursor. The cordierite precursor has a chemical composition which includes 40-60 mass % of silica, 15-45 mass % of alumina, and 5-30 mass % of magnesia. The cordierite precursor may be a mixture of plural inorganic raw materials selected from a group consisting of talc, kaolin, calcined kaolin, alumina, aluminum hydroxide, and silica. The organic binder may include at least one material selected from a group consisting of agar, hydroxypropylmethylcellulose, methylcellulose, hydroxyethylcellulose, carboxymethylcellulose, and polyvinyl alcohol. When a ceramic molded green body includes a cordierite precursor, a firing temperature may be set between 1380-1450° C. or 1400-1440° C. A time window of firing may be 3-10 hours.

Raw material fed into the extruder 10 includes at least ceramic powder, water and binder. Additionally or alternatively, the raw material is a slurry in which ceramic powder, water and binder are mixed. The ceramic powder may be at least one selected from a group consisting of cordierite precursor, silicon carbide, silicon-silicon carbide based composite material, mullite, alumina, aluminum titanate, silicon nitride, and cordierite-silicon carbide based composite material. Use of these material would enhance mechanical strength and heat-resistance. In a case where cordierite is used for the cell-walls 91, 92 of the honeycomb green body 90, a honeycomb structure with low coefficient of thermal expansion and superior heat-shock resistance property would be obtained. Note that, the "silicon-silicon carbide based composite material" is a material formed using silicon carbide (SiC) as an aggregate and silicon (Si) as a bonding material.

The bearer 20 according to the present disclosure has a solid main body 21 provided with a groove 24 in which a concave arc surface 22 extends along one direction, and a sponge layer 25 attached to the arc surface 22 of the groove 24. The sponge layer 25 can be single-layer or multi-layer. The sponge layer 25 is curved along the arc surface 22 of the groove 24 and has a bearing surface 26 curved along the arc surface 22. Such a bearer 20 would allow easier process and higher accuracy for approximating the surface shape or curvature of the bearing surface 26 of the bearer 20 to a target surface shape or curvature. The sponge layer 25 is an elastic porous plastic layer. Therefore, impact caused when the outer peripheral wall 94 of the honeycomb green body 90 touches the bearing surface 26 of the sponge layer 25 is absorbed by elastic deformation of the sponge layer 25, thus avoiding or suppressing a local deformation in the inward region of the honeycomb green body 90 relative to the outer peripheral wall 94.

The target surface shape or curvature of the bearing surface 26 would be determined geometrically based on the surface shape or curvature of the outer peripheral surface 95 of the honeycomb green body 90. In some cases where the honeycomb green body 90 is shaped like a cylinder, the target value of curvature of the bearing surface 26 would be slightly less than the curvature of the outer peripheral surface 95 of the honeycomb green body 90. Note that, when the bearer 20 bears a honeycomb green body 90 extruded from the extruder 10, an extending direction of the groove 24 is parallel to the extrusion direction of the honeycomb green body 90 by the extruder 10, and thus it could be said that the groove 24 extends along the extrusion direction.

The solid main body 21 is more suitable to be machined than the sponge layer 25. Therefore, the groove 24, in turn the arc surface 22 could be highly precisely formed in the solid main body 21. The single-layer or multi-layer sponge layer 25 is attached to such a highly surface-controlled arc surface 22, allowing the sponge layer 25 to be curved along the arc surface 22. As a result, a bearing surface 26 can be formed that is curved along the arc surface 22 of the solid main body 21. The arc surface 22 can be formed precisely, and variation in thickness of the sponge layer 25 would be within a given tolerance range. Therefore, the surface shape or curvature of the bearing surface 26 can be closer to a target surface shape or curvature. Also, the surface shape or curvature of the bearing surface 26 of the sponge layer 25 can be finely set by relatively simple process such as attaching the sponge layer 25 on to the solid main body 21. Note that, the sponge layer 25 may be attached to the solid main body 21 via adhesive or double-face adhesive tape. Also considered may be influences that the thickness of the adhesive or the thickness of the double-face adhesive tape gives to the surface shape or curvature of the bearing surface 26.

It may be envisioned that water content of the raw material fed into the extruder 10 would be lowered to avoid or suppress the inward (radially inward) local deformation of the honeycomb green body relative to the outer peripheral wall. However, in such a case, porosity of a honeycomb fired article obtained by firing the honeycomb green body may be lowered, and therefore it would never be employed as a fundamental solution. The honeycomb fired article may be used as an exhaust gas purifying product, for example.

In connection with the honeycomb green body 90, the number of cells per 1 $cm^2$ in a plane perpendicular to the extrusion direction of the honeycomb green body 90 by the extruder 10 may be 30 to 180, and the thickness of the cell-wall 91, 92 may be 0.05 to 0.30 mm. The thickness of the cell-wall can be measured by an image analyzer (Product Name "NEXIV, VMR-1515" produced by Nikon), for example. In some cases, the number of cells per 1 $cm^2$ is equal to or less than 150, or the number of cells per 1 $cm^2$ is equal to or less than 93, or the number of cells per 1 $cm^2$ is equal to or less than 62. In some cases, the thickness of the cell-wall 91, 92 is equal to or less than 0.30 mm or 0.1 mm or 0.08 mm. Honeycomb green bodies 90 with such a thinner cell-wall thickness and larger cell size may be well borne by the bearer 20 of the present disclosure, avoiding or suppressing reduction of production yield.

In some cases, a width or diameter perpendicular to the extending direction (z-axis in FIG. 7) of the honeycomb green body 90 is equal to or greater than 70 cm or 115 cm or 170 cm. As the width or diameter of the honeycomb green body 90 becomes greater, inward local deformation of the honeycomb green body 90 relative to the outer peripheral wall 94 may be more likely caused due to a force applied to the honeycomb green body 90 when the honeycomb green body 90 touches the bearer 20. Honeycomb green bodies 90 with such a greater width or diameter may be well borne by the bearer 20 of the present disclosure, avoiding or suppressing reduction of production yield.

The solid main body 21 may include or consist of material that allows accurate machining for the surface shape or curvature of the arc surface 22 of the groove 24. For example, the solid main body 21 includes or consists of at least one material selected from a group consisting of a styrene-foam, porous polyurethane resin, and chemical wood. Shore hardness of the arc surface 22 of the groove 24 of the solid main body 21 may be 40 to 70 HS. The sponge layer 25 would be suitably attached to the arc surface 22 having an appropriate hardness. Density of the solid main body 21 may be in a range of 0.1 $g/cm^3$ to 0.65 $g/cm^3$.

The maximum depth D24 of the groove 24 may be equal to or greater than 35 cm. The maximum depth D24 of the groove 24 depends simply on a width or diameter of the honeycomb green body 24 to be borne by the bearer 20. The great maximum depth D24 of the groove 24 is an indication of difficulty for the bearer 20 to bear the honeycomb green body 90 without the local deformation.

The sponge layer 25 may include or consist of soft or flexible material that allows the sponge layer 25 to have a bearing surface 26 curved along the arc surface 22 of the solid main body 21. The sponge layer 25 includes or consists of at least urethane or polyethylene. The sponge layer 25 may be an open cell sponge layer. The sponge layer 25 may be a urethane foam layer or polyethylene foam layer. The sponge layer 25 may be a sponge rubber layer. The sponge rubber includes or consists of at least one material selected from a group consisting of urethane rubber, nitrile rubber, chloroprene rubber, ethylene rubber, silicone rubber, and fluorine rubber.

Density or porosity may also be set appropriately for realizing suitable softness or elasticity of the sponge layer 25. For example, the sponge layer 25 may have a density of 10-40 $g/cm^3$. The density of the sponge layer 25 is 10-30 $g/cm^3$ or 10-15 $g/cm^3$ in some cases.

Hardness of the bearing surface 26 of the sponge layer 25 is desired to be set appropriately. In some cases, a value of 25% hardness of the bearing surface 26 of the sponge layer 25 based on JIS K 6401 standard is equal to or less than 130N, preferably equal to or less than 60N. The 25% hardness is a measurement of load (Newton) when 25% thickness is maintained for 20 seconds relative to the original thickness while the sponge layer 25 is pressed, after the sponge layer 25 is firstly compressed to 75% thickness of the original thickness and the sponge layer 25 recovers to its original shape.

The thickness W25 of the sponge layer 25 may be equal to or greater than 10 mm or 20 mm. If the thickness of the sponge layer 25 is too thin, there is a possibility that sufficient shock absorbing ability of the sponge layer 25 cannot be obtained. If the thickness of the sponge layer 25 is too thick, there is a possibility that a difference between the curvature of the arc surface 22 and the curvature of the bearing surface 26 can be larger.

If a single-layer sponge layer 25 is arranged onto the concave arc surface 22 of the solid main body 21, process of producing the bearer 20 would be simplified, and the surface shape or curvature of the bearing surface 26 would be easily brought closer to a target surface shape or curvature.

The process of producing a honeycomb green body may further include cutting the honeycomb green body 90 borne by the bearer 20. The honeycomb green body 90 may be cut by a wire hung by a pair of bobbins 32 (See FIG. 1). An attachment plate 31 to which the paired bobbins 32 are attached is moved downward so that the honeycomb green body 90 is cut by the wire.

With reference to FIG. 2, further description will be followed for the extruder 10 used as an example. The extruder 10 has a screw 11, a speed reducer 12, a motor 13, a housing 14, a raw material feeding portion 15, a rectifying plate 16, a mesh 17, a discharging unit housing 18, and a die 19. Rotational force supplied from the motor 13 is transmitted to the screw 11 via the speed reducer 12, and the screw 11 rotates around its rotational axis. Rotation of the screw 11 forces the raw material fed into the housing 14 via the raw material feeding portion 15 to flow downstream, i.e. the die 19 side. The raw material flows into an interspace between the rectifying plate 16 and the mesh 17 via holes formed in the rectifying plate 16. The interspace between the rectifying plate 16 and the mesh 17 is filled by the raw material, and in turn an interspace between the mesh 17 and the die 19 is filled by the raw material. Then, the honeycomb green body 90 molded by the die 19 would be extruded from the extruder 10. The extruder 10 used for molding the honeycomb green body 90 may take various configurations depending onto embodiments, and therefore the extruder 10 shown in FIG. 2 would be recognized as an example only. It should be noted that, if water content of the raw material fed into the extruder 10 is reduced so as to avoid or suppress the inward local deformation of the honeycomb green body relative to the outer peripheral wall, there would be a possibility that sufficient extrusion speed of the honeycomb green body 90 by the extruder 10 cannot be obtained or the extrusion of the honeycomb green body 90 itself by the extruder 10 can be difficult.

As shown in FIG. 1, the honeycomb green body 90 being extruded from the extruder 10 gradually descends vertically downward due to gravity, and would be borne by the bearer 20 at a vertically downward position, and would touch the bearing surface 26 of the bearer 20. The honeycomb green body 90 may be borne by a bearer 20 that is moved along the extrusion direction of the honeycomb green body 90 by the extruder 10. For example, the bearer 20 moves at a speed that matches the extrusion speed of the honeycomb green body 90 by the extruder 10 and bears the honeycomb green body 90. Accordingly, the bearer 20 is able to bear the honeycomb green body 90 more stably. Additionally to the above-described solid main body 21 and the single-layer or multi-layer sponge layer 25, the bearer 20 may have a substrate 29 on which the solid main body 21 is mounted. In some cases, a roller conveyor is employed for conveying the bearer 20, and the substrate 29 of the bearer 20 is placed on the rollers. Conveying mechanism such as a belt conveyor other than the roller conveyor can be employed. In some cases, a conveying mechanism is employed that allows circulation of the bearers 20 (illustration is omit).

As shown in FIGS. 3 and 4, the honeycomb green body 90 being extruded from the extruder 10 gradually descends vertically downward as moving downstream in the extrusion direction, and touches the bearing surface 26 of the bearer 20. The surface shape or curvature of the bearing surface 26 of the bearer 20 is set equally to or slightly less than the surface shape or curvature of the outer peripheral surface 95 of the honeycomb green body 90. The honeycomb green body 90 enters into the groove 24 of the bearer 20 and in turn, touches the bearing surface 26 of the bearer 20. The bearing surface 26 of the bearer 20 may be deformed to follow the outer peripheral surface 95 of the honeycomb green body 90 that is touching thereto. That is, the bearing surface 26 moves to the arc surface 22 side in a contact region between the bearing surface 26 of the bearer 20 and the outer peripheral surface 95 of the honeycomb green body 90. The contact region between the bearing surface 26 of the bearer 20 and the outer peripheral surface 95 of the honeycomb green body 90 may be gradually larger as being away from the extruder 10 to the downstream side. As to initial contact between the bearing surface 26 of the bearer 20 and the outer peripheral surface 95 of the honeycomb green body 90, the contact region of the bearing surface 26 of the bearer 20 that touches the outer peripheral surface 95 of the honeycomb green body 90 may be a region 26a at the most bottom side of the groove 24 as shown in FIG. 3, but should not necessary be limited to this, and could be a region 26b shifted from the bottom side of the groove 24 to the opening mouth side of the groove 24 as shown in FIG. 3. As the surface shape or curvature of the bearing surface 26 is precisely set, regardless of change of such initial contact position, inward local deformation of the honeycomb green body 90 relative to the outer peripheral wall 94 due to the contact with the bearing surface 26 would be avoided or suppressed.

As shown in FIG. 3, the solid main body 21 has a top surface 23 where the groove 24 is formed. The maximum depth D24 of the groove 24 is measured from the top surface 23 of the solid main body 21. The sponge layer 25 has a bottom surface 27 opposite to the bearing surface 26, and the bottom surface 27 of the sponge layer 25 is arranged onto the arc surface 22 of the groove 24. Thickness W25 of the sponge layer 25 is measured as a distance between the bearing surface 26 and the bottom surface 27 or as a distance between the arc surface 22 and the bearing surface 26 ignoring the thickness of adhesive layer or double-face adhesive tape. When an adhesive is used for attaching the sponge layer 25 to the arc surface 22 of the groove 24 of the solid main body 21, as the sponge layer 25 is porous, adhesive may possibly enter into the sponge layer 25. In such a case, a suitable thickness of the sponge layer 25 may be equal to or greater than 10 mm.

As shown in FIG. 5, the sponge layer 25 may extend up to the top surface 23 of the solid main body 21 where the groove 24 is formed. In such a case, an edge 23a between the top surface 23 of the solid main body 21 and the arc surface 22 is covered by the sponge layer 25, and a round surface 26c corresponding to the edge 23a would be formed in the bearing surface 26. Accordingly, inward local deformation of the honeycomb green body 90 relative to the outer peripheral wall 94 due to contact with the end of the sponge layer 25 would be avoided or suppressed.

Method of producing a bearer 20 for bearing a honeycomb green body 90 will be described with reference to FIGS. 6A-6D. A method of producing a bearer 20 includes: a step of laminating a sponge layer 25 onto a flexible sheet member 28 (See FIG. 6A)); a step of introducing the sheet member 28, while being curved, into a groove 24 of a solid main body 21 where a concave arc surface 22 extends in one direction (See FIG. 6B); and a step of attaching the sponge layer 25, curved as the curved sheet member 28, to the arc surface 22 of the groove 24 (See FIG. 6C). Such a process would facilitate that the sponge layer 25 is evenly attached to the arc surface 22 of the bearer 20, avoiding or suppressing a variation being caused in the thickness of the sponge layer 25 attached to the arc surface 22. As a result, the surface shape or curvature of the bearing surface 26 can be brought to be closer to a target surface shape or curvature. In a case where the sponge layer 25 is directly attached to the arc surface 22 of the groove 24 of the solid main body 21, a variation would be caused in the thickness of the sponge layer 25 attached to the arc surface 22 because the sponge layer 25 may stretch.

In some cases, the sponge layer 25 in a flat state is laminated onto the sheet member 28 in a flat state. This would effectively suppress a variation in thickness of the sponge layer 25 in a plane.

Figure 6A:
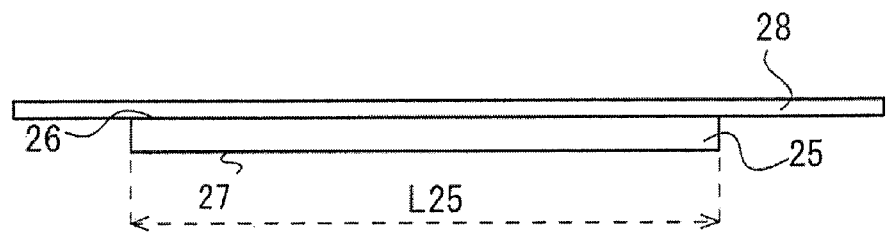
FIGS. 6A-6D are schematic process views showing a method of producing a bearer.
Figure 6B:
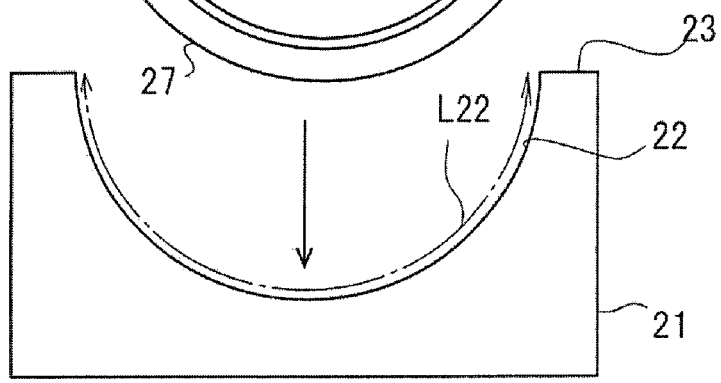
Figure 6C:
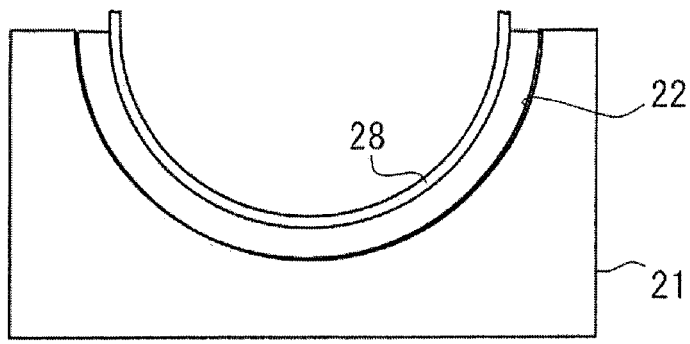

Length L25 of the sponge layer 25 shown in FIG. 6A may be equal to or greater than the length L22 of the arc surface 22 shown in FIG. 6B. The process of producing a bearer 20 additionally includes a step of attaching an end of the sponge layer 25 to the top surface 23 of the solid main body 21 where the groove 24 is formed (See FIG. 5).

Figure 6D:
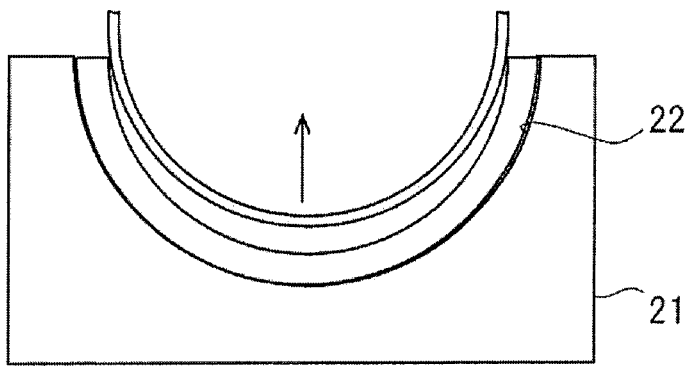

Method of producing a bearer 20 may additionally include a step of peeling the sheet member 28 off the sponge layer 25 that has been attached to the arc surface 22 (See FIG. 6D).

The sheet member 28 may be a flexible solid or non-porous rubber sheet and optionally has a thickness of 0.2-1.0 mm. The sponge layer 25 may be laminated onto the sheet member 28 via a double-face adhesive tape having a lower adhesion and the like. In contrast, the sponge layer 25 is relatively firmly laminated onto the arc surface 22 of the solid main body 21 via an adhesive or a double-face adhesive tape. Therefore, the sheet member 28 can be smoothly or easily peeled off the sponge layer 25 (See FIG. 6D), after the sponge layer 25 has been attached to the arc surface 22 of the groove 24 of the solid main body 21 (See FIG. 6C).

Working Example

In a working example, the honeycomb green body extruded from the extruder had 93 cells per 1 cm$^2$ and 0.064 mm of cell-wall thickness. Diameter perpendicular to the extending direction (z-axis in FIG. 7) of the honeycomb green body was 195 mm, and the length along the extending direction was 190 mm. Configuration of the bearer that bears the honeycomb green body was as described in Chart 1. The bearer was moved at a speed that matches the extrusion speed of the honeycomb green body from the extruder, and the honeycomb green body was borne by the bearer. Configuration of the solid main body was described in Chart 2. Double-face adhesive tape was used to attach the sponge layer 25 to the arc surface 22 of the groove 24 of the solid main body 21. Yield rate was as described in Chart 3. Note that, in a comparative example 1, used was a solid main body identical to one of the working example 1 except that a sponge layer is not attached thereto.

CHART 1

| | Material of sponge layer | Density of sponge layer | Thickness of sponge layer | 25% hardness |
|---|---|---|---|---|
| Working example 1 | urethane | 13 g/cm$^3$ | 10 mm | 59N |
| Working example 2 | urethane | 20 g/cm$^3$ | 10 mm | 110N |
| Working example 3 | urethane | 26 g/cm$^3$ | 10 mm | 130N |

CHART 2

| | Material of solid main body | Density of solid main body | Maximum Depth | Shore hardness |
|---|---|---|---|---|
| Working example 1 | Chemical Wood | 0.55 g/cm$^3$ | 108 mm | 55HS |
| Working example 2 | Chemical Wood | 0.55 g/cm$^3$ | 108 mm | 55HS |
| Working example 3 | Chemical Wood | 0.55 g/cm$^3$ | 108 mm | 55HS |

CHART 3

| | Yield Rate |
|---|---|
| Working example 1 | 100% |
| Working example 2 | 100% |
| Working example 3 | 100% |
| Comparative example 1 | 0% |

Based on the above teachings, a skilled person would be able to add various modifications to the respective embodiments.

What is claimed is:

1. A method of producing a honeycomb green body, the method comprising:
    an extruder extruding through a die a honeycomb green body so that a lattice of cell-walls is formed in accordance with a structure of the die, the lattice of cell-walls defining a plurality of cells extending in an extrusion direction of the honeycomb green body by the extruder, the number of cells per 1 cm$^2$ in a plane perpendicular to the extrusion direction being 30 to 180, and a thickness of the cell-walls being 0.05 to 0.30 mm; and
    a bearer bearing at a vertically downward position the honeycomb green body extruded from the extruder, wherein
    the bearer comprises:
    a solid main body provided with a groove in which an arc surface recessed vertically downward extends along the extrusion direction, the solid main body including chemical wood; and
    a single-layer or multi-layer sponge layer attached to the arc surface of the groove, the sponge layer being curved along the arc surface of the groove and having a bearing surface curved along the arc surface.

2. The method of producing a honeycomb green body according to claim 1, wherein the sponge layer includes at least urethane or polyethylene.

3. The method of producing a honeycomb green body according to claim 1, wherein the sponge layer is an open cell sponge layer.

4. The method of producing a honeycomb green body according to claim 1, wherein a value of 25% hardness of the bearing surface of the sponge layer based on JIS K 6401 standard is equal to or less than 130N.

5. The method of producing a honeycomb green body according to claim 1, wherein a thickness of the sponge layer is between 10 mm and 20 mm.

6. The method of producing a honeycomb green body according to claim 1, wherein shore hardness of the arc surface is 40 to 70 HS.

7. The method of producing a honeycomb green body according to claim 1, wherein the maximum depth of the groove is equal to or greater than 35 cm.

8. The method of producing a honeycomb green body according to claim 1, wherein the sponge layer of a single layer is provided onto the recessed arc surface of the solid main body.

9. The method of producing a honeycomb green body according to claim 1, further comprising:
cutting the honeycomb green body borne by the bearer.

10. The method of producing a honeycomb green body according to claim 1, wherein a density of the solid main body is in a range of 0.1 $g/cm^3$ to 0.65 $g/cm^3$.

11. The method of producing a honeycomb green body according to claim 1, wherein a diameter of the honeycomb green body is equal to or greater than 70 cm.

12. The method of producing a honeycomb green body according to claim 11, wherein the diameter of the honeycomb green body is equal to or greater than 115 cm.

13. The method of producing a honeycomb green body according to claim 12, wherein the diameter of the honeycomb green body is equal to or greater than 170 cm.

14. A method of producing a honeycomb fired article including:
an extruder extruding through a die a honeycomb green body so that a lattice of cell-walls is formed in accordance with a structure of the die, the lattice of cell-walls defining a plurality of cells extending in an extrusion direction of the honeycomb green body by the extruder, the number of cells per 1 $cm^2$ in a plane perpendicular to the extrusion direction being 30 to 180, and a thickness of the cell-walls being 0.05 to 0.30 mm;
a bearer bearing at a vertically downward position the honeycomb green body extruded from the extruder, and
firing the honeycomb green body, wherein
the bearer comprises:
a solid main body provided with a groove in which an arc surface recessed vertically downward extends along the extrusion direction, the solid main body including chemical wood; and
a single-layer or multi-layer sponge layer attached to the arc surface of the groove, the sponge layer being curved along the arc surface of the groove and having a bearing surface curved along the arc surface.

* * * * *